United States Patent
Hake et al.

(10) Patent No.: US 12,502,271 B2
(45) Date of Patent: Dec. 23, 2025

(54) SUTURE RIGGING ASSEMBLY

(71) Applicant: Cephea Valve Technologies, Inc., Santa Clara, CA (US)

(72) Inventors: Jarred Hake, Fremont, CA (US); Randolf Von Oepen, Aptos, CA (US); Stephanie Gatchalian, San Jose, CA (US)

(73) Assignee: Cephea Valve Technologies, Inc., Abbott Park, IL (US)

( * ) Notice: Subject to any disclaimer, the term of this patent is extended or adjusted under 35 U.S.C. 154(b) by 737 days.

(21) Appl. No.: 17/815,793

(22) Filed: Jul. 28, 2022

(65) Prior Publication Data
US 2023/0030110 A1    Feb. 2, 2023

Related U.S. Application Data

(60) Provisional application No. 63/228,269, filed on Aug. 2, 2021.

(51) Int. Cl.
*A61F 2/24*    (2006.01)

(52) U.S. Cl.
CPC .... *A61F 2/2409* (2013.01); *A61F 2250/0098* (2013.01)

(58) Field of Classification Search
CPC ......... A61F 2/2439; A61F 2/24; A61F 2/2409
See application file for complete search history.

(56) References Cited

U.S. PATENT DOCUMENTS

| | | | |
|---|---|---|---|
| 8,157,852 B2 * | 4/2012 | Bloom | A61F 2/07 623/2.11 |
| 8,728,155 B2 | 5/2014 | Montorfano | |
| 8,870,948 B1 | 10/2014 | Erzberger | |
| 9,370,423 B2 * | 6/2016 | Ryan | A61F 2/2433 |
| 9,439,757 B2 | 9/2016 | Wallace | |
| 9,668,859 B2 * | 6/2017 | Kheradvar | A61F 2/2427 |
| 10,143,552 B2 | 12/2018 | Wallace | |
| 10,368,990 B2 | 8/2019 | Noe | |
| 10,470,881 B2 | 11/2019 | Noe | |
| 10,631,981 B2 | 4/2020 | Von Oepen | |

(Continued)

FOREIGN PATENT DOCUMENTS

| | | | | |
|---|---|---|---|---|
| CN | 118845305 A | * | 10/2024 | ........... A61F 2/2427 |
| WO | WO-2009002548 A1 | * | 12/2008 | ............. A61F 2/013 |

(Continued)

*Primary Examiner* — Alvin J Stewart
(74) *Attorney, Agent, or Firm* — SLEMAN & LUND LLP

(57) ABSTRACT

A suture rigging assembly for use with a prosthetic heart valve delivery device includes a coupling ring having a plurality of apertures, and at least one tether coupled to the apertures of the coupling ring and extending distally therefrom. Each tether is formed by two lengths of suture thread, the lengths of suture thread joined together at a position spaced from the coupling ring, and a second joining of the lengths of suture thread forming an attachment loop at the distal end of the tether. The first connection in the tethers collectively define the shortest and longest lengths of each of the tethers, and the attachment loops provide a mechanism to releasably attach the tethers to a prosthetic heart valve. Optionally, knots can be used to join the tethers and one or more tethers may include a radiopaque marker secured thereon between two knots.

13 Claims, 9 Drawing Sheets

(56) References Cited

U.S. PATENT DOCUMENTS

| | | | |
|---|---|---|---|
| 10,639,151 B2 | 5/2020 | Von Oepen | |
| 10,646,689 B2 | 5/2020 | Von Oepen | |
| 10,661,052 B2 | 5/2020 | Mcniven | |
| 10,751,485 B2* | 8/2020 | von Oepen | A61M 25/0028 |
| 10,874,512 B2* | 12/2020 | von Oepen | A61F 2/9525 |
| 10,974,027 B2* | 4/2021 | McNiven | A61B 5/0215 |
| 11,109,967 B2* | 9/2021 | von Oepen | A61F 2/2427 |
| 11,324,495 B2 | 5/2022 | Von Oepen | |
| 2004/0024451 A1* | 2/2004 | Johnson | A61F 2/2412 623/2.11 |
| 2005/0075712 A1* | 4/2005 | Biancucci | A61F 2/2418 606/108 |
| 2010/0082089 A1* | 4/2010 | Quadri | A61F 2/95 623/1.11 |
| 2012/0290078 A1* | 11/2012 | Bourang | A61F 2/2433 623/2.11 |
| 2015/0073539 A1* | 3/2015 | Geiger | A61F 2/2439 623/2.11 |
| 2015/0112430 A1* | 4/2015 | Creaven | A61F 2/2436 623/2.11 |
| 2016/0158000 A1 | 6/2016 | Granada | |
| 2017/0156859 A1* | 6/2017 | Chang | A61F 2/2418 |
| 2017/0165066 A1* | 6/2017 | Rothstein | A61F 2/2418 |
| 2017/0325955 A1* | 11/2017 | Richter | A61F 2/2427 |
| 2018/0092744 A1* | 4/2018 | von Oepen | A61F 2/2439 |
| 2018/0110622 A1 | 4/2018 | Gregg | |
| 2019/0247188 A1 | 8/2019 | Wallace | |
| 2019/0374342 A1* | 12/2019 | Gregg | A61F 2/2439 |
| 2020/0129292 A1 | 4/2020 | Haynes | |
| 2020/0155804 A1* | 5/2020 | von Oepen | A61F 2/2439 |
| 2021/0205073 A1* | 7/2021 | Haynes | A61F 2/2418 |
| 2021/0267755 A1 | 9/2021 | Wallace | |
| 2021/0361404 A1* | 11/2021 | Haynes | A61F 2/9525 |
| 2022/0087814 A1 | 3/2022 | Vidlund | |
| 2022/0192824 A1 | 6/2022 | Vidlund | |

FOREIGN PATENT DOCUMENTS

| | | | | |
|---|---|---|---|---|
| WO | WO-2009091509 A1 * | 7/2009 | | A61F 2/2418 |
| WO | 2016183523 A1 | 11/2016 | | |
| WO | 2016183526 | 11/2016 | | |
| WO | 2020236735 A1 | 11/2020 | | |
| WO | WO-2024233105 A1 * | 11/2024 | | A61F 2/2418 |

\* cited by examiner

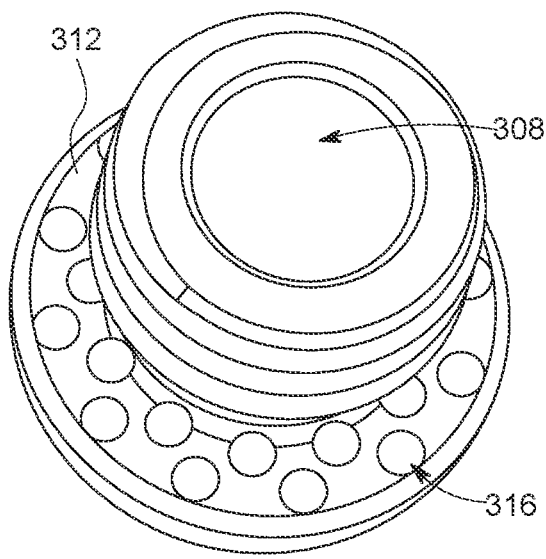
FIG. 6
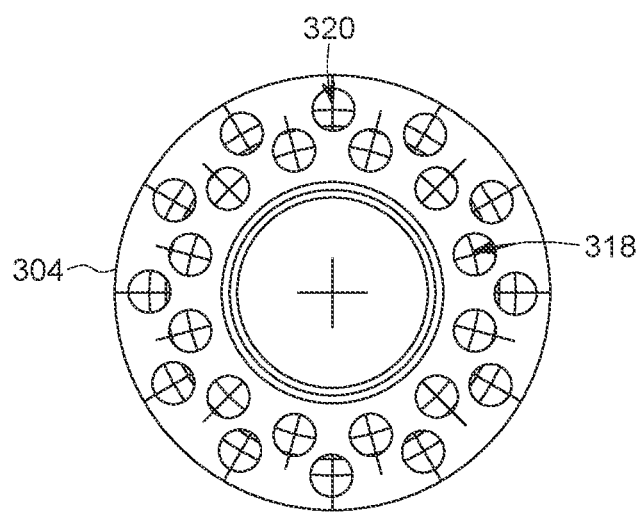
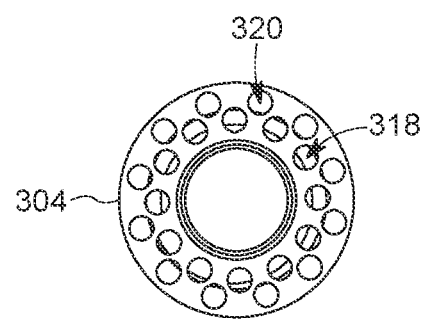
FIG. 7A  FIG. 7B

SUTURE RIGGING ASSEMBLY

RELATED APPLICATIONS

This application claims priority to U.S. Provisional Application No. 63/228,269, titled "SUTURE RIGGING ASSEMBLY," and filed Aug. 2, 2021, the entirety of which is incorporated by reference herein.

BACKGROUND

The present disclosure relates generally to heart valve replacement, and more particularly to collapsible prosthetic heart valves. Still more particularly, the present disclosure relates to devices used in collapsing prosthetic heart valves for loading into a delivery catheter and for maintaining the prosthetic heart valve in an at least partially collapsed state until fully deployed.

The mitral valve lies between the left atrium and the left ventricle of the heart. Various diseases can affect the function of the mitral valve, including degenerative mitral valve disease and mitral valve prolapse. These diseases can cause mitral stenosis, in which the valve fails to open fully and thereby obstructs blood flow, and/or mitral insufficiency, in which the mitral valve is incompetent and blood flows passively in the wrong direction.

Many patients with heart disease, such as problems with the mitral valve, are intolerant of the trauma associated with open-heart surgery. Age or advanced illness may have impaired the patient's ability to recover from the injury of an open-heart procedure. Additionally, the high costs associated with open-heart surgery and extra-corporeal perfusion can make such procedures prohibitive.

Patients in need of cardiac valve repair or cardiac valve replacement can be served by minimally invasive techniques. In many minimally invasive procedures, small devices are manipulated within the patient's body under visualization from a live imaging source like ultrasound, fluoroscopy, or endoscopy. Minimally invasive cardiac procedures are inherently less traumatic than open procedures and may be performed without extra-corporeal perfusion, which carries a significant risk of procedural complications.

During minimally invasive procedures for cardiac valve replacement, an appropriate valve prosthesis generally must be collapsed into a small delivery catheter for delivery to and deployment within the native valve annulus. Such collapsing can be difficult and time-consuming. Devices that assist in collapsing the valve prosthesis for loading into the delivery catheter and for maintaining the valve prosthesis in an at least partially collapsed condition until fully deployed are described herein.

BRIEF SUMMARY

The present disclosure describes a suture rigging assembly including a coupling ring having a proximal end, a distal end and a plurality of apertures formed in the distal end, and at least one tether attached to the distal end of the coupling ring. The tether includes a suture thread threaded through a respective pair of the apertures to define first and second suture lengths, wherein the first and second suture lengths are joined at a spaced distance from the coupling ring.

The present disclosure also describes a suture rigging assembly including a coupling ring having a proximal end, a distal end and a plurality of apertures formed in the distal end. The assembly includes at least one tether having a proximal end, a distal end and a first length of suture continuous with a second length of suture, with the proximal end of the tether attached to the distal end of the coupling ring and the first and second lengths of suture joined together to define a loop at the distal end of the tether.

The present disclosure also describes a coupling ring including a cylindrical body having a longitudinal axis, a proximal end, a distal end, and a first diameter; and a head at the distal end of the cylindrical body, the head having a largest diameter that is greater than the first diameter, and including a plurality of apertures extending parallel to the longitudinal axis.

The present disclosure additionally describes a method of delivering a prosthetic heart valve into a patient. The method includes applying a padding suture thread around a circumference of a distal end of a coupling ring, the coupling ring having a plurality of apertures therein; threading one or more suture threads through the apertures in the coupling ring to form a plurality of pairs of suture thread lengths; securing the suture thread lengths in each pair together to form a plurality of tethers; securing a radiopaque marker between two knots in a group of the tethers; forming a loop at a distal end of each of the tethers; connecting a proximal end of the coupling ring to a distal end of a delivery device; attaching the loops to a prosthetic heart valve; applying tension to the tethers to retract the prosthetic heart valve into the delivery device; advancing the delivery device to a target location within the patient; deploying the prosthetic heart valve at the target location; releasing the tension on the tethers to disengage the tethers from the prosthetic heart valve; and retracting the coupling ring and the tethers into the delivery device.

In some embodiments, the method of delivering the prosthetic heart valve into the patient can include forming a stop knot in at least one of the tethers, including each of the tethers.

BRIEF DESCRIPTION OF THE DRAWINGS

A more complete appreciation of the subject matter of the present disclosure and the various advantages thereof can be realized by reference to the following detailed description in which reference is made to the accompanying drawings in which:

FIG. 6 is a rear perspective view of the coupling ring of FIGS. 3A-B;

FIGS. 7A-B are distal end views of the coupling ring of FIGS. 3A-B;

DETAILED DESCRIPTION

As used herein, the terms "proximal" and "distal," when used in connection with a delivery device or components of a delivery device, including a suture rigging assembly, are to be taken as relative to a user of such device. "Proximal" is to be understood as relatively close to the user when the device is being used as intended, and "distal" is to be understood as relatively far away from the user when the device is being used as intended. As used herein, the terms "substantially," "generally," "approximately," and "about" are intended to mean that slight deviations from absolute are included within the scope of the term so modified.

The suture rigging assembly described herein can be used to attach a wide variety of prosthetic heart valves to a catheter-based delivery device, to load the prosthetic heart valve into the delivery device, and to sustain a tensile load path between the prosthetic heart valve and the delivery device until the valve is deployed in a patient. Exemplary prosthetic heart valves that can be used with the suture rigging assembly described herein include the expandable prosthetic heart valves described in U.S. Patent Publication No. 2016/0158000; in U.S. Pat. No. 8,870,948; and in PCT Publication No. WO 2016/183526, the disclosures of all of which are hereby incorporated by reference herein. For example, the suture rigging devices described herein are configured for use with prosthetic heart valves, such as prosthetic mitral valves, having pins to which tethers of the suture rigging assembly attach.

Figure 1:
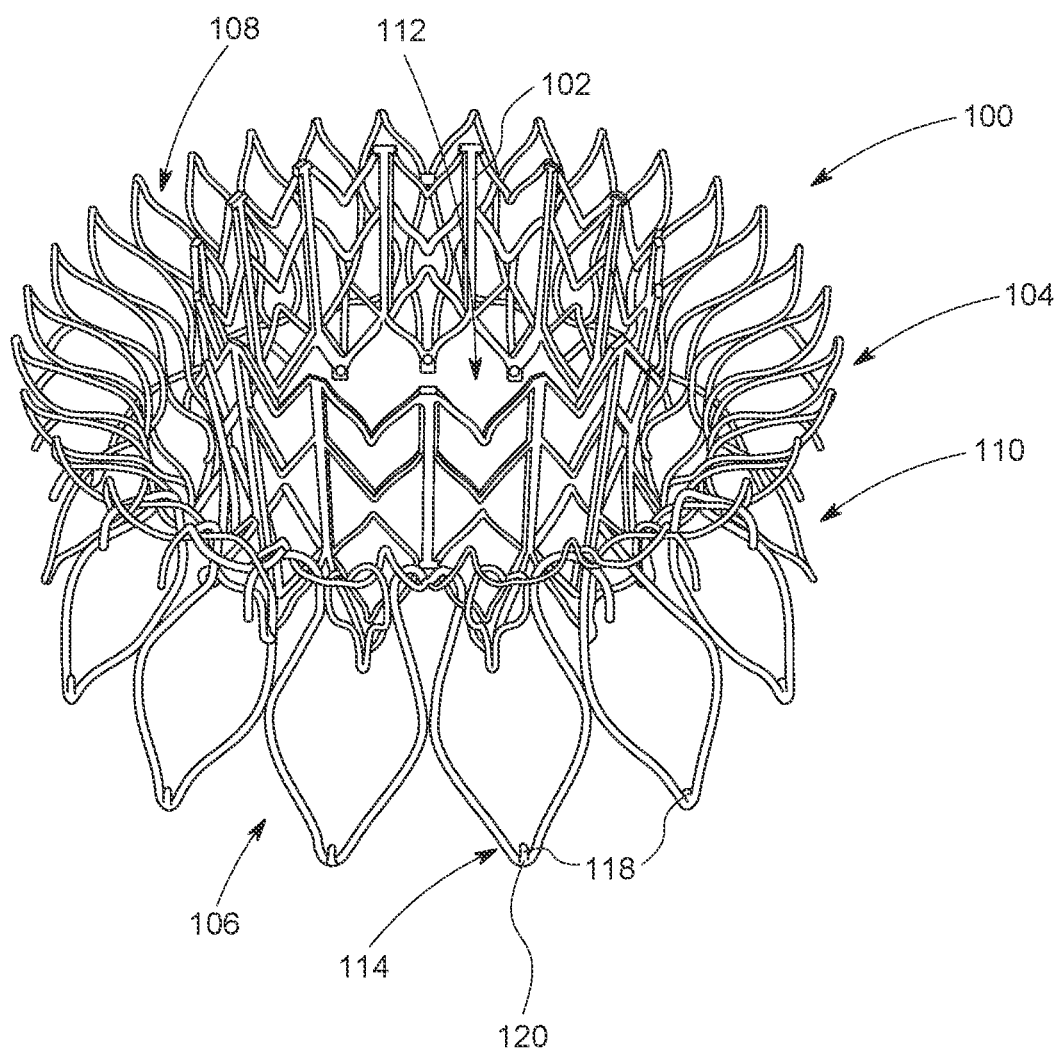
FIG. 1 is a perspective view of a frame structure for a prosthetic heart valve according to the prior art.

FIG. 1 is a perspective view of the frame structure for an exemplary prosthetic heart valve 100 according to the prior art. Prosthetic heart valve 100 may be a prosthetic mitral valve having an expandable and collapsible frame structure that includes an inner strut frame 102 surrounded by an outer anchor assembly 104. However, prosthetic heart valve 100 may be suitable for replacing other native heart valves, such as the tricuspid valve, the aortic valve or the pulmonary valve. Anchor assembly 104, shown in an expanded state, includes an atrial anchor 106 configured to be positioned on the atrial side of the native mitral valve annulus, a ventricular anchor 108 configured to be positioned on the ventricular side of the native mitral valve annulus, and a central portion 110 positioned axially between the atrial anchor and the ventricular anchor. Anchor assembly 104 may have an hourglass shape in the expanded state in that each of the atrial anchor 106 and the ventricular anchor 108 flares radially outward of the central portion 110, such that the central portion defines a waist between the atrial anchor and the ventricular anchor. Strut frame 102 may be positioned radially inward of anchor assembly 104 and may be formed of a plurality of interconnected struts. The radially inner surface of strut frame 102 defines a perimeter of a central opening 112, which enables blood to flow through prosthetic heart valve 100.

Prosthetic heart valve 100 includes one or more leaflets (not shown) that may be secured to strut frame 102 and disposed at least partially in central opening 112. The leaflets are configured to coapt with one another to control blood flow through the prosthetic heart valve, allowing blood to flow from the atrial anchor 106 toward the ventricular anchor 108 (the antegrade direction), but substantially blocking blood from flowing in the opposite (retrograde) direction. In some embodiments, one or more skirts or cuffs (not shown) may partially or fully cover inner and/or outer surfaces of anchor assembly 104 and/or strut frame 102. Such skirts or cuffs may be formed from fabric and/or tissue materials, for example.

Both the atrial anchor 106 and the ventricular anchor 108 of anchor assembly 104 include a plurality of petals 114 that are joined to one another around the circumference of the anchor assembly. When prosthetic heart valve 100 is in a fully expanded state, the petals 114 on both atrial anchor 106 and ventricular anchor 108 are fully extended radially outward, as shown in FIG. 1. Prosthetic heart valve 100 is naturally in an expanded state when no force is applied to petals 114. The petals 114 of anchor assembly 104 may be configured to collapse and/or to reduce the outer diameter of the frame structure when the frame structure is loaded into a delivery device. When prosthetic heart valve 100 is in a collapsed state, the petals 114 on both atrial anchor 106 and ventricular anchor 108 are at least partially collapsed radially inward. Prosthetic heart valve 100 may be placed in the collapsed state by applying pressure to petals 114 in a radially inward direction.

The petals 114 on atrial anchor 106 or ventricular anchor 108 may include a pin 118 or other attachment member to which tether loops may be connected, as will be described below. Pins 118 may be attached to or formed on some or all of the petals 114 on atrial anchor 106 and/or ventricular anchor 108 and are sized and shaped so that the tether loops remain attached when under tension but are released after the deployment of prosthetic valve 100 within the patient. As shown in FIG. 1, pins 118 may be provided at the apex 120 of each petal 114 on atrial anchor 106. However, this need not be the case and pins 118 may be provided on less than all of the petals 114 of atrial anchor 106, on some or all of the petals of ventricular anchor 108, or at other locations on anchor assembly 104.

Figure 2:
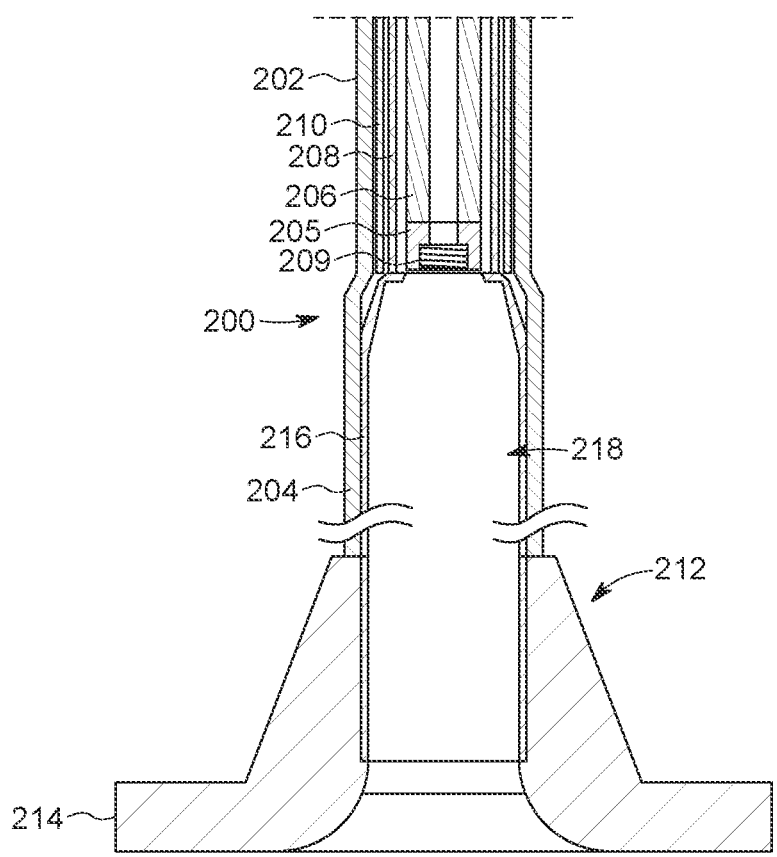
FIG. 2 is a longitudinal cross-sectional view of a distal end portion of one embodiment of a delivery catheter for a prosthetic heart valve.
Figures 3A, 3B:
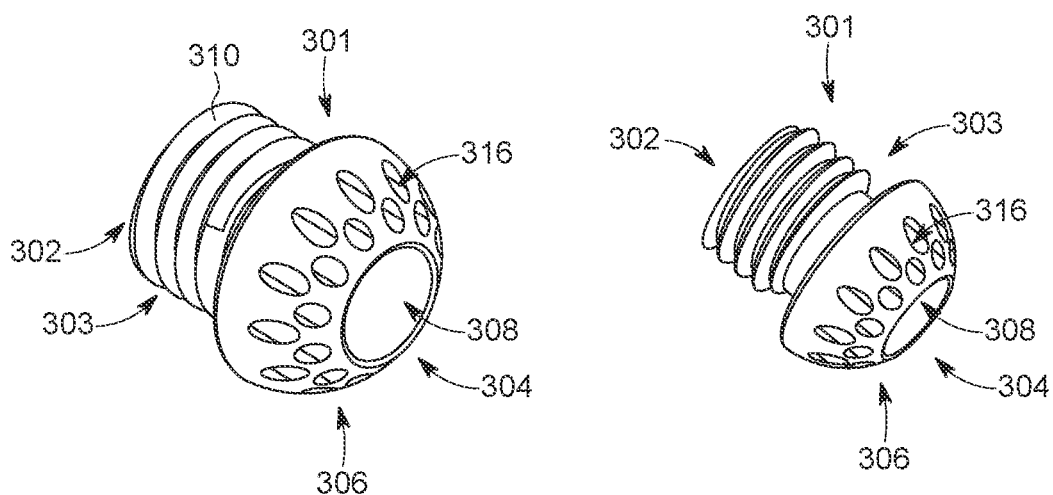
FIGS. 3A-B are perspective views of one embodiment of a coupling ring of a suture rigging assembly of the present disclosure.
Figure 4:
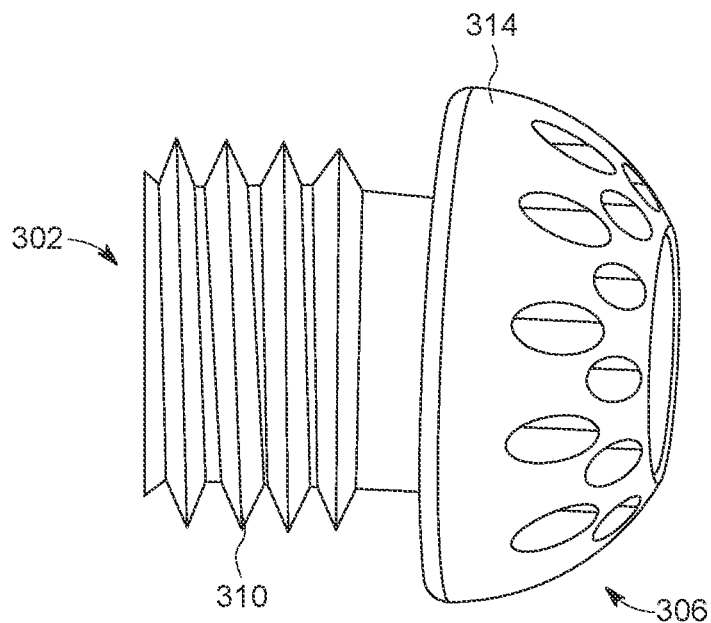
FIG. 4 is a side elevational view of the coupling ring of FIGS. 3A-B.
Figure 5:
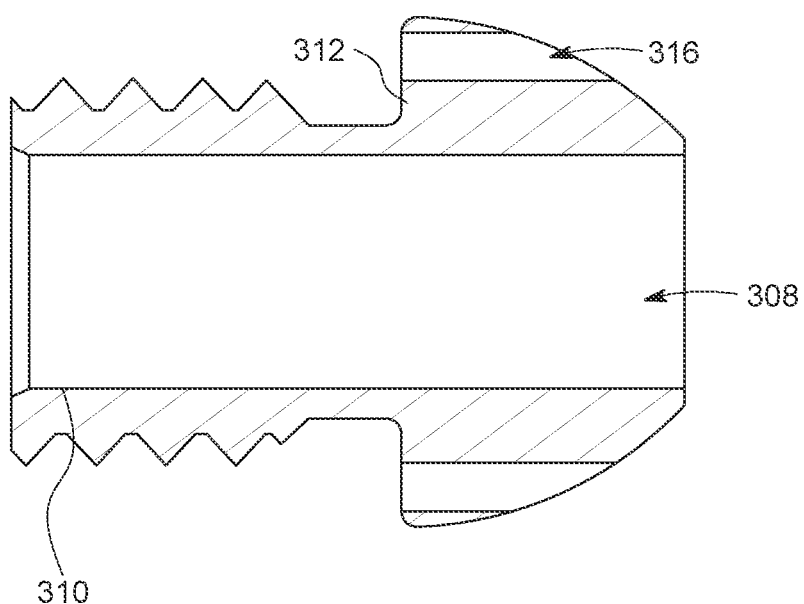
FIG. 5 is a longitudinal cross-sectional view of the coupling ring of FIGS. 3A-B.
Figure 8A:
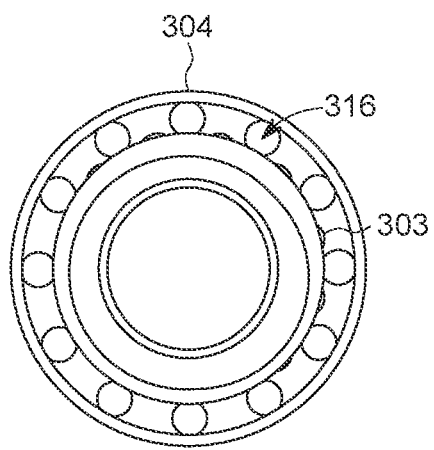
FIGS. 8A-B is a proximal end view of the coupling ring of FIGS. 3A-B.
Figure 8B:
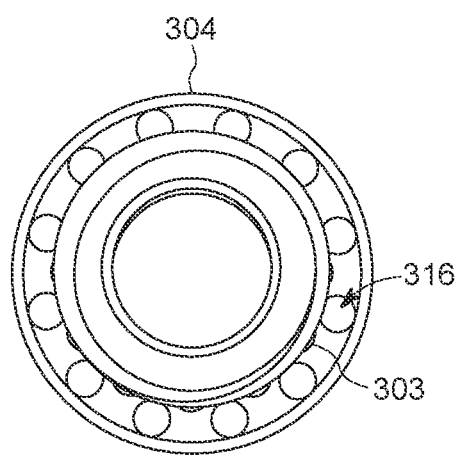
Figure 9:
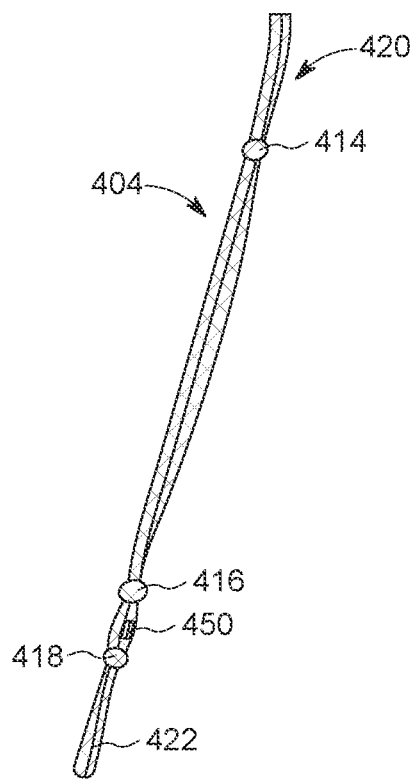
FIG. 9 illustrates a tether.
Figure 10:
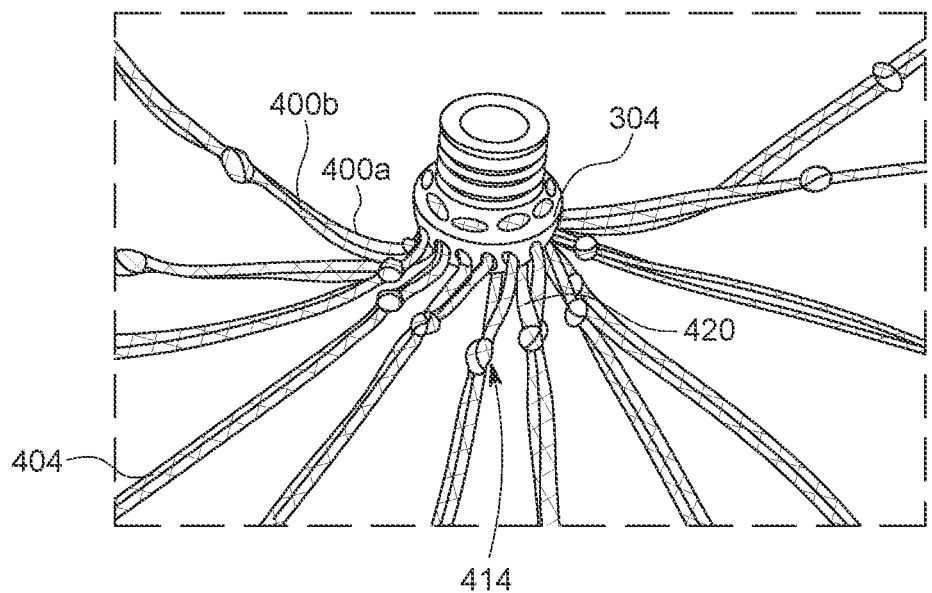
FIG. 10 is a partial perspective view of the suture rigging assembly according to the present disclosure, including the coupling ring of FIGS. 3A-B and a plurality of the tethers of FIG. 9 attached to the coupling ring.

A portion of the distal end of a delivery device 200 for delivering and deploying prosthetic heart valve 100 within a patient is shown in FIG. 2. Delivery device 200 may include an outer delivery sheath 202. At its distal end, outer delivery sheath 202 may have a portion with an enlarged diameter that serves as a valve cover 204 for receiving prosthetic heart valve 100 and maintaining it in a collapsed condition until it is deployed. In one embodiment, a suture catheter 206, an extension catheter 208, and a steering catheter 210 may be located coaxially within outer sheath 202 and may be slidable relative to one another. Delivery device 200 may also include a guidewire (not shown) positioned within and extending through the lumen of suture catheter 206. A control handle (not shown) may be attached to the proximal ends of suture catheter 206, extension catheter 208, steering catheter 210 and outer delivery sheath 202, and may be used to manipulate and control movement of these various components relative to one another to perform various functions. Suture catheter 206 may include a tip ring 205 at its distal end. Tip ring 205 may include internal threads 209 for threaded engagement with suture rigging assembly 300, as described below. Other mechanisms for attaching suture rigging assembly 300 to delivery device 200 are also contemplated herein.

Figure 13:
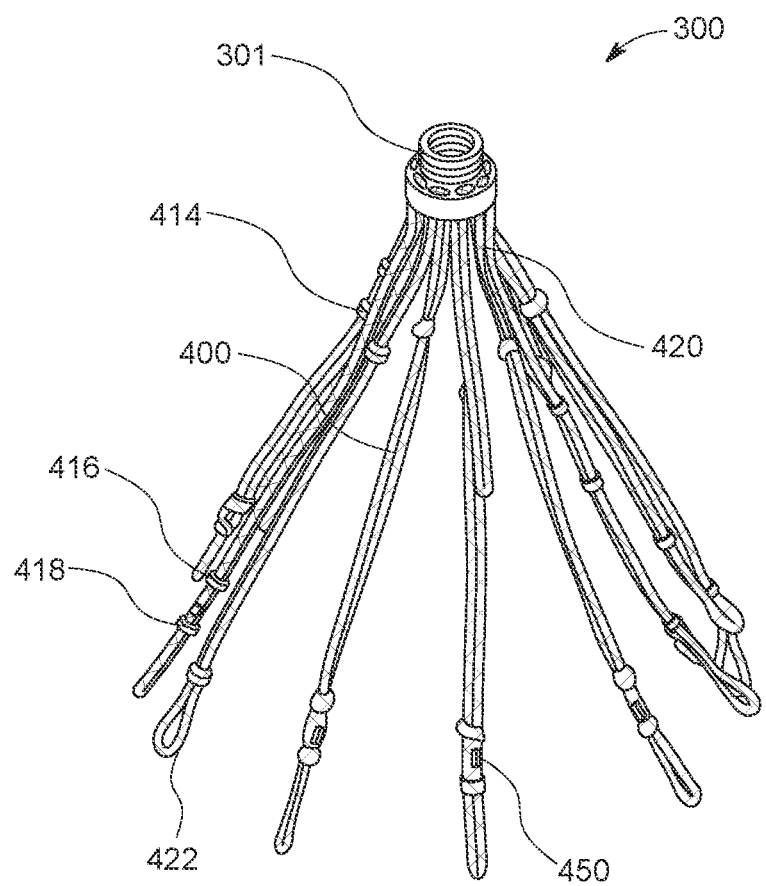
FIG. 13 is a perspective view of the suture rigging assembly showing radiopaque markers attached to the tethers.

A suture rigging assembly 300 that assists in collapsing and drawing prosthetic heart valve 100 into delivery device 200 is shown in FIG. 13. Suture rigging assembly 300 includes a coupling ring 301 to which a plurality of suture tethers may be attached. One embodiment of coupling ring 301 is illustrated in FIGS. 3-8. As shown, coupling ring 301 extends in a longitudinal direction between a distal end 306 and a proximal end 302, and has somewhat of a mushroom shape with a generally cylindrical body 303 at the proximal end terminating in an enlarged head 304 at the distal end. A lumen 308 may extend in the longitudinal direction through the cylindrical body 303 and head 304 of coupling ring 301 and may be sized to receive a component of a delivery device, a guidewire, a guidewire lumen (also referred to as a nosecone catheter) or another structure therethrough.

As illustrated, cylindrical body 303 may be formed with external threads 310 that are sized and shaped to securely connect to the internal threads 209 in the tip ring 205 of suture catheter 206. However, as mentioned, the present disclosure contemplates other fasteners for attaching coupling ring 301 to delivery device 200. In one example, the cylindrical body 303 of coupling ring 301 could be formed with internal threads designed to mate with external threads on suture catheter 206 or another component of delivery device 200. In another example, the cylindrical body 303 of coupling ring 301 may be eliminated, and the internal threads could be formed within the enlarged head 304 of the coupling ring. In still another embodiment, coupling ring 301 could include a transverse pin or a pair of aligned bosses protruding from opposite sides of cylindrical body 303 that are configured to mate with corresponding undercut recesses formed in suture catheter 206 or another component of delivery device 200. Other fastening mechanisms, including, but not limited to, a snap connection mechanism, are also contemplated so long as they are sufficiently strong to withstand the substantial tensile forces that will be exerted thereon as prosthetic heart valve 100 is collapsed and loaded into delivery device 200.

The head 304 of coupling ring 301 has a diameter that is substantially larger than the diameter of cylindrical body 303, thereby defining a shoulder 312 extending around the cylindrical body and facing toward the proximal end 302 of the coupling ring. Head 304 may have a domed or hemispherical surface 314 facing away from the proximal end 302 of coupling ring 301, the purpose of which will be explained below. Other smoothly curved surfaces are also possible, including elliptical, oval, oblong and the like. A plurality of round apertures or bores 316 may extend through head 304 from shoulder 312 to surface 314. Bores 316 may extend parallel to one another and parallel to the longitudinal direction of coupling ring 301, and each has a diameter sized to receive a length of suture thread. Bores 316 may extend in two rings in an annular direction around the central longitudinal axis of coupling ring 301, an inner ring 318 and an outer ring 320. In the illustrated embodiment, coupling ring 301 has twenty-four bores, with twelve bores in inner ring 318 and twelve bores in outer ring 320. However, coupling ring 301 may have more or less than twenty-four bores, and the number of bores in the inner and outer rings need not be the same. Further, bores 316 need not be arranged in concentric rings, but may be arranged in any pattern that will avoid the suture threads becoming entangled with one another when assembled to coupling ring 301.

As a result of the curvature of surface 314, the bores 316 in inner ring 318 will define an elliptical shape with a relatively small major axis where they intersect surface 314. The bores 316 in outer ring 320, on the other hand, will define an elliptical shape with a larger major axis where they intersect surface 314. The major axes of the ellipses defined by the bores 316 in both inner ring 318 and outer ring 320 extend in directions radially outward from the central longitudinal axis of coupling ring 301. This arrangement enables the suture threads 400 that extend through bores 316 to fan radially outward and may minimize contact with a sharp edge or corner of coupling ring 301.

One or more suture threads 400 may be attached to the head 304 of coupling ring 301. The suture threads 400 may be comprised of various materials, both man-made and natural. Examples of natural suture materials may include, but are not limited to, silk, linen, and catgut. Examples of synthetic suture materials may include, but are not limited to, textiles such as nylon or polyester, or flexible metallic cables. Referring to FIGS. 9-13, an elongated suture thread 400 may be threaded through a plurality of the bores 316 in coupling ring 301 to form tethers 404. Suture rigging assembly 300 may include a coupling ring 301 having at least one tether 404 or a plurality of tethers. For example, suture thread 400 may be threaded distally through a bore 316 in inner ring 318 and then proximally though an adjacent bore in outer ring 320, thereby forming an elongated loop or tether 404 extending distally from coupling ring 301. Thus, tether 404 includes two lengths of suture thread 400a and 400b extending side-by-side and continuous with one another at their distal ends. Suture thread 400 may then be threaded distally through an adjacent bore 316 in inner ring 318 and then proximally through an adjacent bore in outer ring 320, thereby forming another elongated loop or tether 404 extending distally from coupling ring 301. This pattern may be repeated to form a plurality of elongated loops or tethers 404 around the entire circumference of coupling ring 301. Thus, tethers 404 may be formed by a single continuous suture thread 400, with the leading and trailing ends of the suture thread being joined to one another by one or more terminating knots 412. Multiple terminating knots 412 may be used to create a more compact configuration. Specifically, leading and trailing lengths of suture thread 400 may be secured together with a first terminating knot 412 spaced from the ends of the suture thread, resulting in two remaining lengths of the suture thread leading from the first terminating knot 412. These remaining lengths may then be wrapped around the cylindrical body 303 of coupling ring 301, pulling the first terminating knot closer to coupling ring 301. The ends of suture thread 400 may then be secured with a second terminating knot 412. Any remaining lengths of the suture thread may then be trimmed away from the second terminating knot 412. Using multiple knots in this way may decrease the protrusions of suture thread 400 from the cylindrical body 303 of coupling ring 301 and may additionally result in a more secure attachment between the suture thread and the coupling ring. Alternatively, tethers 404 may be formed by multiple suture threads 400, with each suture thread forming plural tethers, and with the adjacent ends of the threads being joined to one another by a terminating knot 412. In a still further alternative, a large knot may be formed at the ends of the suture thread that cannot be pulled through bores 316.

Figure 11:
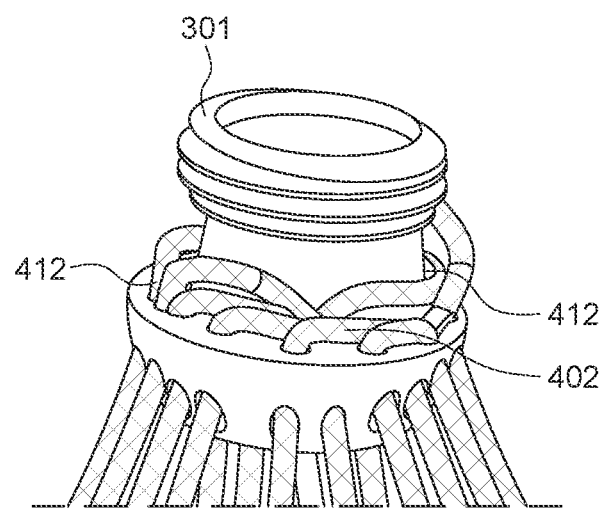
FIG. 11 is an enlarged partial view of the suture rigging assembly showing the attachment of the tethers to the coupling ring.
Figure 12:
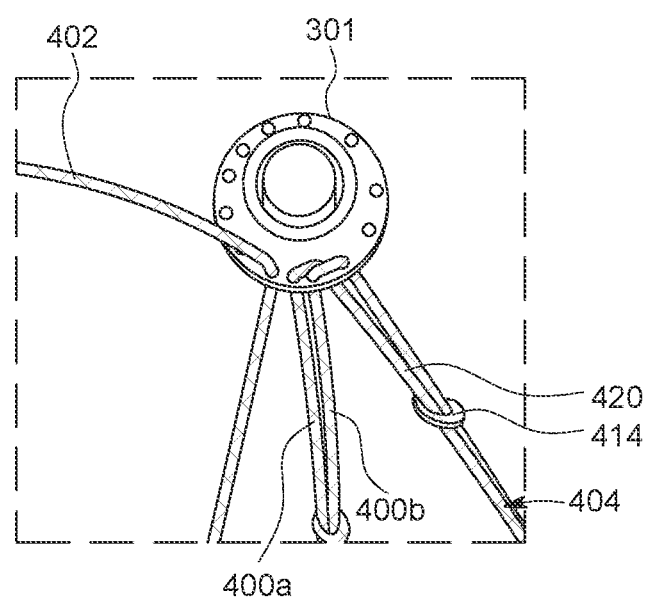
FIG. 12 is a proximal end view showing the attachment of a padding suture beneath the suture threads of the tethers attached to the coupling ring.

As suture threads 400 are being attached to coupling ring 301, a length 402 of suture thread optionally may be positioned around the circumference of the coupling ring and captured between the shoulder 312 of head 304 and the loops of the suture thread being threaded through bores 316, all as shown in FIGS. 11 and 12. Padding suture thread 402 may simply be an additional length of suture thread 400. In such event, padding suture thread 402 may be a leading or trailing end of the suture thread threaded through bores 316 to form tethers 404. Padding suture thread 402 may simply be held in place between the shoulder 312 of head 304 and the suture thread loops, or may be tied off with the opposite end of suture thread 400 with terminating knots 412. If padding suture thread 402 is formed from a material with a different diameter than suture thread 400, or from a separate length of suture thread 400, the padding suture thread may be knotted to itself with a knot that may sit under the terminating knot 412 securing the tethers. In instances where the diameter of padding suture thread 402 is the same as the diameter of tethers 404, the padding suture thread may be secured with a terminating knot 412. Padding suture thread 402 may protect suture threads 400 from damage due to contact with any sharp edges on coupling ring 301 and may otherwise reduce stress concentrations in tethers 404 at their interface with the coupling ring when under load, thereby enabling each of the tethers to exhibit an increased tensile capacity. The inclusion of padding suture thread 402 can result in between a 10 and 20 percent increase in the tensile capacity of suture rigging assembly 300.

Suture threads 400a and 400b forming a tether 404 may be joined together by a first knot or stop knot 414 at a spaced distance from coupling ring 301. Stop knots 414 reduce the ability of suture threads 400a and 400b to separate too far from one another or to create a large loop or lasso. The distance between the knots on a tether 404 will define the maximum loop or lasso that can be formed by the tether. As a result of using knots, any loop or lasso able to form will be smaller in size than the loop or lasso in a tether 404 that does not have any knots. Preventing the formation of large loops or lassos is important because a large loop or lasso may become entangled with the apexes of the ventricular anchor 108, thereby impairing the user's ability to pull back the entangled tether 404 after valve 100 has been deployed. As shown in FIG. 13, stop knots 414 in adjacent tethers 404 preferably are formed at different spaced distances from coupling ring 301. For example, the stop knots 414 in a first group of tethers 404 may be spaced a first distance from coupling ring 301, and the stop knots in a second group of tethers that alternate with the tethers in the first group may be spaced a second distance greater than the first distance from the coupling ring. By offsetting the stop knots 414 in adjacent tethers 404 from one another, the tethers are better able to collapse to a smaller, more compact cross-sectional size within the confines of delivery device 200.

The stop knots 414 in tethers 404 create in each tether an upper or proximal connecting loop 420 between the knot and coupling ring 301. The ability of suture thread 400 to move freely within bores 316 enables the lengths of tethers 404 to self-adjust to a certain degree. That is, each tether 404 is free to move proximally until its stop knot 414 contacts coupling ring 301 and is free to move distally until the stop knots in the adjacent tethers contact the coupling ring. Therefore, as one tether 404 lengthens as it moves distally, there is a corresponding proximal movement and shortening of the adjacent tethers on either side of it, in the manner of a pulley. This adjustment in the lengths of tethers 404 enables a balancing of the load imparted to each of the tethers as prosthetic heart valve 100 is collapsed during loading into delivery device 200 or during re-sheathing. For example, if a shorter tether 404 experiences a higher tensile stress upon the loading of prosthetic heart valve 100 into delivery device 200, that tether may lengthen as the adjacent tethers shorten until the tensile stress on all of the tethers reaches an equilibrium point at which the total tensile stress is substantially evenly distributed among all of the tethers. Maintaining a balanced load among tethers 404 prevents any one of the tethers from becoming overloaded and breaking, which can impede the functionality of the entire system. Further, more evenly distributing the load among tethers 404 enables the overall tensile capacity of suture rigging assembly 300 to be increased.

Additional knots may also be formed at the distal or closed end of tethers 404. As shown in FIG. 13, a third knot or lower fixture knot 418 may be formed at a spaced distance from the distal end of tether 404, forming a closed attachment loop 422 therein. Attachment loops 422 are intended to hook onto the pins 118 of prosthetic heart valve 100 and to apply tension to assist in collapsing the prosthetic heart valve during loading into delivery device 200, as described more fully below. Preferably, attachment loops 422 have a relatively small size so that, following their release from pins 118 during deployment, they do not become entangled with the pins or other structures of prosthetic heart valve 100, impeding proper deployment of the heart valve and removal of delivery device 200 from the patient.

To help visualize the locations of tethers 404, and in particular the positions of attachment loops 422, during the deployment of prosthetic heart valve 100 in a patient, some embodiments of suture rigging assembly 300 may include a radiopaque marker 450 on all or at least some of the tethers. Radiopaque markers 450 may be formed of any material that can be readily visualized under fluoroscopy, including metals such as gold, platinum, platinum-iridium, tantalum, tantalum-tungsten, and others, and may take any shape. Preferably, radiopaque markers 450 have a bore or channel extending therethrough so that the markers may be threaded onto suture threads 400a and/or 400b before lower fixture knot 418 is formed therein or as suture thread 400 is threaded through bores 316. In some embodiments, radiopaque markers 450 may be cylindrical, with a bore extending therethrough along the longitudinal axis of the cylinder. The radiopaque markers 450 provided on suture rigging assembly 300 need not all have the same shape, and different shapes may be assembled to various tethers 404 to indicate the orientation of prosthetic heart valve 100 or to identify various portions thereof. Moreover, if any of tethers 404 is improperly affixed to prosthetic heart valve 100 or becomes improperly affixed to the prosthetic heart valve during delivery of the heart valve into the patient or during deployment, radiopaque markers 450 may help to identify which of the tethers is improperly affixed and identify its location.

Radiopaque markers 450 may be held in a fixed position on tethers 404 by lower fixture knot 418 at the distal end of the marker and by a second or upper fixture knot 416 formed in the tether at the proximal end of the marker. Fixture knots 416 and 418 capture the radiopaque marker 450 therebetween and prevent it from sliding along the length of tether 404 toward or away from attachment loop 422. As a less preferable alternative, adhesives can be used to attach the radiopaque markers 450 at fixed positions to tethers 404. As a result, once a radiopaque marker 450 has been identified under fluoroscopy, the user will know the position of the attachment loop 422 associated with that marker.

The use of knots to form suture rigging assembly 300 provides several advantages. Firstly, it enables adhesives to be avoided, reducing sterilization, storage and biocompatibility issues that adhesives may create. The elimination of adhesives may also reduce the formation of very small particles during the use of delivery device 200, which particles could potentially be released into the patient's bloodstream. The use of knots throughout suture rigging assembly 300 also enables the assembly to be self-balancing, minimizing the tensile stress in any one tether 404 and increasing the overall tensile capacity of the suture rigging assembly. Finally, the various knots in each tether 404 keeps suture threads 400*a* and 400*b* close to one another to prevent undesirable entanglement of the tethers with structures of prosthetic heart valve 100 during deployment.

Suture rigging assembly 300 can be used to attach, load, and release a wide variety of heart valves to/from a wide variety of catheter-based delivery systems. Thus, suture rigging assembly 300 is designed to attach to a prosthetic heart valve and sustain a tensile load path between the heart valve and a delivery device as the heart valve is retracted into a sheath of the delivery device.

One way in which suture rigging assembly 300 may be used to collapse and load prosthetic heart valve 100 into the valve cover 204 of delivery device 200 will now be described. Initially, suture rigging assembly 300 is attached to prosthetic heart valve 100. This is accomplished by fitting some or, preferably, all of the attachment loops 422 at the distal ends of tethers 404 over respective pins 118 on prosthetic heart valve 100. Although this is described here as an initial step, it need not be the first step in the process. Suture rigging assembly 300 may be attached to delivery device 200 first, as described below, followed by the attachment of prosthetic heart valve 100 to the suture rigging assembly.

Referring back to FIG. 2, a loading funnel 212 that can be used to help load prosthetic heart valve 100 into valve cover 204 is shown attached to the distal end of the valve cover. In one embodiment, loading funnel 212 may include a funnel portion 214 located at its distal end and an elongated tubular portion 216 located at its proximal end. Funnel portion 214 may smoothly transition from a relatively large diameter at its distal end to a relatively small diameter where it meets tubular portion 216. The diameter at the distal end of funnel portion 214 is preferably larger than the outer diameter of prosthetic heart valve 100 in its expanded condition, and the diameter of the funnel portion where it meets tubular portion 216 is preferably about the same as the diameter of the lumen 218 of the tubular portion. The outer diameter of tubular portion 216 is preferably slightly smaller than the inner diameter of valve cover 204 and the length of the tubular portion may be about the same as the length of the valve cover, such that the tubular portion can be selectively inserted into and nest within the valve cover. Funnel portion 214 may include a plurality of slots (not shown) extending longitudinally along its inner surface. These slots are intended to accommodate the pins 118 of prosthetic heart valve 100 and prevent them from bending laterally as the heart valve is being collapsed.

Figure 14:
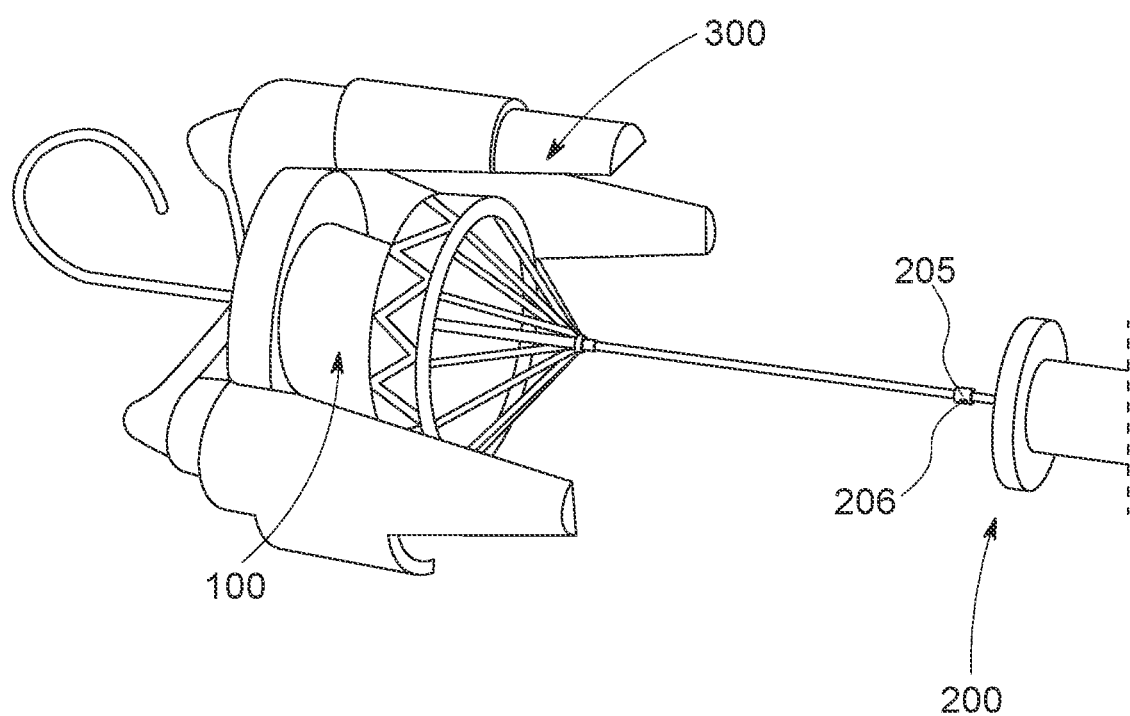
FIG. 14 is a perspective view of the suture rigging assembly attached between the delivery catheter and a prosthetic heart valve.

With the tubular portion 216 of loading funnel 212 positioned within valve cover 204, controls located on the operating handle of delivery device 200 may be manipulated to cause suture catheter 206 to advance distally relative to the other components of the delivery device until the tip ring 205 of the suture catheter extends distally beyond the distal end of the tubular portion and into the interior of funnel portion 214. At that point, the threads 310 of coupling ring 301 may be threaded into the threaded portion 209 of tip ring 205 at the distal end of suture catheter 206. FIG. 14 illustrates suture rigging assembly 300 connected to prosthetic heart valve 100 and aligned for connection to the suture catheter 206 of delivery device 200. Suture catheter 206 may then be retracted proximally, drawing suture rigging assembly 300 and prosthetic heart valve 100 proximally along with it. As proximal movement continues, tethers 404 are drawn into the lumen of the tubular portion 216 of loading funnel 212. This, in combination with the sloping walls of funnel portion 214, causes the petals 114 on atrial anchor 106 to collapse toward the central axis of prosthetic heart valve 100 and, eventually, to enter the lumen 218 of tubular portion 216. Further proximal movement of suture catheter 206 continues until the petals 114 on ventricular anchor 108 also collapse toward the central axis of prosthetic heart valve 100 and the prosthetic heart valve is completely collapsed and completely positioned within the lumen 218 of the tubular portion 216. At that juncture, while maintaining tension on suture catheter 206, loading funnel 212 may be removed from valve cover 204, leaving the fully collapsed prosthetic heart valve 100 positioned completely within the valve cover. An atraumatic tip (not shown) of the delivery device may then be retracted to enclose the open distal end of valve cover 204.

In another embodiment, the loading funnel may have a generally cylindrical shape with internal threads at one end and an internal diameter that is about the same as the inner diameter of valve cover 204. The internal threads may mate with external threads at the free end of valve cover 204 to join the loading funnel to the valve cover. A smooth radius on the lumen at the free end of the funnel may help to guide prosthetic heart valve 100 into the funnel lumen.

Once properly loaded, delivery device 200 may be inserted into a patient and directed to a target location, such as the mitral valve annulus, at which prosthetic heart valve 100 may be deployed. To deploy prosthetic heart valve 100, valve cover 204 is retracted proximally over valve 100 while the valve is maintained in position by extension catheter 208. The ventricular anchor 108 of valve 100 will then begin to expand until only the proximal end of the valve (i.e., atrial anchor 106) is held in a collapsed condition by a small cup at the distal end of extension catheter 208. The accurate positioning and orientation of prosthetic heart valve 100 may then be confirmed, after which suture catheter 206 may be advanced distally, relieving tension in tethers 404 and allowing atrial anchor 106 to escape from the cup at the distal end of extension catheter 208 and expand. Suture catheter 206 may be advanced further through the expanded prosthetic heart valve until tethers 404 slip off of pins 118. Suture catheter 206 may then be retracted back into outer delivery sheath 202, the atraumatic tip may be retracted to again close the open end of valve cover 204, and delivery device 200 may be removed from the patient.

To summarize the foregoing, the present disclosure describes a suture rigging assembly, including a coupling ring having a proximal end, a distal end and a plurality of apertures formed in the distal end; and at least one tether attached to the distal end of the coupling ring, the tether including a suture thread threaded through a respective pair of the apertures to define first and second suture lengths, with the first and second suture lengths joined at a spaced distance from the coupling ring; and/or the first and second suture lengths may be joined by a knot at a spaced distance from the coupling ring; and/or the proximal end of the coupling ring may include a fastener configured to mate with a complementary fastener on a delivery device; and/or a plurality of the tethers may be attached to the distal end of the coupling ring; and/or at least one of the plurality of tethers may include a radiopaque marker; and/or each of the plurality of tethers may include at least one knot; and/or each of the tethers may have a length adjustable between a shortest length and a longest length; and/or each of the tethers may include a stop knot spaced from the coupling ring, the stop knot of a selected tether defining the shortest length of the selected tether; and/or the stop knots of the tethers adjacent the selected tether may define the longest length of the selected tether; and/or the suture rigging assembly may include at least one radiopaque marker fixed between two knots; and/or the plurality of tethers may include a first group of tethers and a second group of tethers, each of the tethers in the first group may alternate with a tether in the second group around a circumference of the coupling ring, and the knot on each tether of the first group may be located at a different distance from the coupling ring than the knot on each of the tethers in the second group; and/or the suture rigging assembly may include a padding suture positioned between a portion of each of the tethers and the coupling ring; and/or the padding suture may be located between the coupling ring and a delivery device when the delivery device is attached to the coupling ring; and/or a single continuous suture thread may be threaded through multiple apertures to form the plurality of tethers.

The present disclosure also describes a suture rigging assembly, including a coupling ring having a proximal end, a distal end and a plurality of apertures formed in the distal end; and at least one tether having a proximal end, a distal end and a first length of suture continuous with a second length of suture, with the proximal end of the tether attached to the distal end of the coupling ring and the first and second lengths of suture joined together to define a loop at the distal end of the tether; and/or the first and second lengths of suture threads may be joined together by a knot to define a loop at the distal end of the tether; and/or the proximal end of the coupling ring may include a fastener configured to connect to a complementary fastener on a delivery device; and/or the suture rigging assembly may include a plurality of the tethers; and/or at least one of the plurality of tethers may include a radiopaque marker; and/or each of the plurality of tethers may include at least one knot; and/or each of the tethers may have a length adjustable between a shortest length and a longest length; and/or each of the tethers may include a stop knot spaced from the coupling ring, the stop knot of a selected tether defining the shortest length of the selected tether; and/or the stop knots of the tethers adjacent the selected tether may define the longest length of the selected tether; and/or the suture rigging assembly may include at least one radiopaque marker fixed between two knots; and/or the plurality of tethers may include a first group of tethers and a second group of tethers, each of the tethers in the first group may alternate with a tether in the second group around a circumference of the coupling ring, and the knot on each tether of the first group may be located at a different distance from the coupling ring than the knot on each of the tethers in the second group; and/or the suture rigging assembly may include a padding suture positioned between apportion of each of the tethers and the coupling ring; and/or the padding suture may be located between the coupling ring and a delivery device when the delivery device is attached to the coupling ring; and/or a single continuous suture thread may be threaded through multiple apertures to form the plurality of tethers.

The present disclosure also describes a coupling ring including a cylindrical body having a longitudinal axis, a proximal end, a distal end, and a first diameter; and a head at the distal end of the cylindrical body, the head having a largest diameter that is greater than the first diameter, and including a plurality of apertures extending parallel to the longitudinal axis; and/or the proximal end of the cylindrical body may be configured to releasably attach to a delivery device; and/or the coupling ring may further include a lumen extending along the longitudinal axis through the cylindrical body and the head; and/or the plurality of apertures may extend in two concentric rings in an annular direction around the longitudinal axis.

The present disclosure also describes a method of delivering a prosthetic heart valve into a patient, including applying a padding suture thread around a circumference of a distal end of a coupling ring, the coupling ring having a plurality of apertures therein; threading one or more suture threads through the apertures in the coupling ring to form a plurality of pairs of suture thread lengths; securing the thread lengths in each pair together to form a plurality of tethers; forming a stop knot in each of the tethers; securing a radiopaque marker between two knots in a group of the tethers; forming a loop at a distal end of each of the tethers; connecting a proximal end of the coupling ring to a distal end of a delivery device; attaching the loops to a prosthetic heart valve; applying tension to the tethers to retract the prosthetic heart valve into the delivery device; advancing the delivery device to a target location within the patient; deploying the prosthetic heart valve at the target location; releasing the tension on the tethers to disengage the tethers from the prosthetic heart valve; and retracting the coupling ring and the tethers into the delivery device; and/or the step of applying tension to the tethers may cause a length of each tether in a group of the tethers to be adjusted between a shortest length and a longest length.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A suture rigging assembly, comprising:
a coupling ring having a proximal end, a distal end and a plurality of apertures formed in the distal end; and
a plurality of tethers attached to the distal end of the coupling ring, each of the plurality of tethers including a suture thread threaded through a respective pair of the apertures to define first and second suture lengths, the first and second suture lengths joined at a spaced distance from the coupling ring, wherein each of the plurality of tethers includes at least one knot, wherein each of the tethers has a length adjustable between a shortest length and a longest length, wherein each of the tethers includes a stop knot spaced from the coupling ring, the stop knot of a selected tether defining the shortest length of the selected tether.

2. The suture rigging assembly of claim 1, wherein the first and second suture lengths are joined by a knot at a spaced distance from the coupling ring.

3. The suture rigging assembly of claim 1, wherein the proximal end of the coupling ring includes a fastener configured to mate with a complementary fastener on a delivery device.

4. The suture rigging assembly of claim 1, wherein at least one of the plurality of tethers includes a radiopaque marker.

5. The suture rigging assembly of claim 1, wherein the stop knots of the tethers adjacent the selected tether define the longest length of the selected tether.

6. The suture rigging assembly of claim 1, further comprising at least one radiopaque marker fixed between two knots.

7. The suture rigging assembly of claim 1, wherein the plurality of tethers include a first group of tethers and a second group of tethers, each of the tethers in the first group alternates with a tether in the second group around a circumference of the coupling ring, and the knot on each of the tethers in the first group is located at a different distance from the coupling ring than the knot on each of the tethers in the second group.

8. The suture rigging assembly of claim 1, further comprising a padding suture positioned between a portion of each of the tethers and the coupling ring.

9. The suture rigging assembly of claim 8, wherein the padding suture is located between the coupling ring and a delivery device when the delivery device is attached to the coupling ring.

10. The suture rigging assembly of claim 1, wherein a single continuous suture thread is threaded through multiple apertures to form the plurality of tethers.

11. A suture rigging assembly, comprising:
a coupling ring having a proximal end, a distal end and a plurality of apertures formed in the distal end;
a plurality of tethers attached to the distal end of the coupling ring, each of the plurality of tethers including a suture thread threaded through a respective pair of the apertures to define first and second suture lengths, the first and second suture lengths joined at a spaced distance from the coupling ring, wherein each of the plurality of tethers includes at least one knot; and
at least one radiopaque marker fixed between two knots.

12. A suture rigging assembly, comprising:
a coupling ring having a proximal end, a distal end and a plurality of apertures formed in the distal end; and
a plurality of tethers attached to the distal end of the coupling ring, each of the plurality of tethers including a suture thread threaded through a respective pair of the apertures to define first and second suture lengths, the first and second suture lengths joined at a spaced distance from the coupling ring, wherein each of the plurality of tethers includes at least one knot,
wherein the plurality of tethers include a first group of tethers and a second group of tethers, each of the tethers in the first group alternates with a tether in the second group around a circumference of the coupling ring, and the knot on each of the tethers in the first group is located at a different distance from the coupling ring than the knot on each of the tethers in the second group.

13. A suture rigging assembly, comprising:
a coupling ring having a proximal end, a distal end and a plurality of apertures formed in the distal end; and
a plurality of tethers attached to the distal end of the coupling ring, each of the plurality of tethers including a suture thread threaded through a respective pair of the apertures to define first and second suture lengths, the first and second suture lengths joined at a spaced distance from the coupling ring; and
a padding suture positioned between a portion of each of the tethers and the coupling ring.

\* \* \* \* \*